(12) United States Patent
Iwanczyk et al.

(10) Patent No.: US 6,521,894 B1
(45) Date of Patent: Feb. 18, 2003

(54) GAMMA-RAY DETECTOR EMPLOYING SCINTILLATORS COUPLED TO SEMICONDUCTOR DRIFT PHOTODETECTORS

(75) Inventors: Jan S. Iwanczyk, Los Angeles, CA (US); Bradley E. Patt, Sherman Oaks, CA (US)

(73) Assignee: Photon Imaging, Inc., Northridge, CA (US)

( * ) Notice: Subject to any disclaimer, the term of this patent is extended or adjusted under 35 U.S.C. 154(b) by 0 days.

(21) Appl. No.: 09/437,903

(22) Filed: Nov. 9, 1999

Related U.S. Application Data (60) Provisional application No. 60/107,763, filed on Nov. 9, 1998.

(51) Int. Cl.[7] .................................................. G01T 1/20

(52) U.S. Cl. ................................................. 250/370.11

(58) Field of Search ................................ 250/367, 368, 250/370.11, 370.14

(56) References Cited

U.S. PATENT DOCUMENTS

| | | | | |
|---|---|---|---|---|
| 3,784,819 A | * | 1/1974 | Martone et al. | 250/366 |
| 4,560,882 A | * | 12/1985 | Barbaric et al. | 250/487.1 |
| 4,688,067 A | | 8/1987 | Rehak et al. | 257/429 |
| 5,051,801 A | * | 9/1991 | Van Eijk et al. | 257/465 |
| 5,171,998 A | | 12/1992 | Engdahl et al. | 250/363.02 |
| 5,773,829 A | | 6/1998 | Iwanczyk et al. | 250/367 |

FOREIGN PATENT DOCUMENTS

| | | |
|---|---|---|
| WO | WO 94/25878 | 11/1994 |

OTHER PUBLICATIONS

Copy of the International Search Report dated Mar. 29, 2000 for corresponding International Application No. PCT/US 99/26524.

Hartmann, et al., "Ultrathin entrance windows for silicon drift detectors", Nuclear Instruments & Methods In Physics Research, (1997) Section A, pp 250–254.

Olschner, "Silicon Drift Photodiode Array Detectors", IEEE Transactions On Nuclear Science, Jun. 1996, vol. 43, No. 3, pp 1407–1410.

Fiorini, et al., "Performances of a Silicon Drift Chamber as Fast Scintillator Photodectector for Gamma–Ray Spectroscopy", IEEE Transactions On Nuclear Science, Jun. 1998, vol. 45, No. 3, pp. 483–496.

Castoldi, et al., "Fast silicon drift photodiodes free from bias connections on the light enterind side", Nuclear Instruments & Methods In Physics Research, (2000), Section A, pp. 483–496.

* cited by examiner

*Primary Examiner*—Constantine Hannaher
*Assistant Examiner*—Shun Lee
(74) *Attorney, Agent, or Firm*—Christie, Parker & Hale, LLP (57) ABSTRACT

Radiation detectors according to one embodiment of the invention are implemented using scintillators combined with a semiconductor drift photodetectors wherein the components are specifically constructed in terms of their geometry, dimensions, and arrangement so that the scintillator decay time and drift time in the photodetector pairs are matched in order to achieve a greater signal-to-noise ratio. The detectors may include electronics for amplification of electrical signals produced by the silicon drift photodetector, the amplification having a shaping time optimized with respect to the decay time of the scintillator and time spread of the signal in the silicon drift photodetector to substantially maximize the ratio of the signal to the electronic noise.

16 Claims, 9 Drawing Sheets

GAMMA-RAY DETECTOR EMPLOYING SCINTILLATORS COUPLED TO SEMICONDUCTOR DRIFT PHOTODETECTORS

This application claims the benefit of U.S. Provisional Application No. 60/107,763, filed Nov. 9, 1998.

GOVERNMENT LICENSE RIGHTS

This invention was made with government support under Small Business Invention Research Program (grant no. DEFG03-97ER82451) awarded by the Department of Energy. The government has certain rights in this invention.

BACKGROUND OF THE INVENTION

The present invention relates to radiation detection and, more specifically, to a radiation detector comprising a scintillator and a semiconductor drift photodetector wherein the scintillator decay time and drift time in the photodetector are matched in order to achieve the best signal-to-noise ratio.

For gamma-ray spectroscopy applications there are two primary detection systems from which one may choose, namely: the scintillator/photomultiplier tube (PMT) combination and germanium. Scintillator/PMT systems offer excellent efficiency but have relatively poor energy resolution. PMT's are also bulky and fragile components that are vulnerable to damage, have low and non-uniform quantum efficiency, require a stabilized high voltage for operation, and are undesirably affected by magnetic fields. Consequently, there has been an ongoing need for suitable alternatives to replace either the PMT, or the entire scintillator/PMT system, for gamma-ray spectrometry.

Germanium semiconductor detectors are excellent in terms of their energy resolution capabilities. They are also essentially insensitive to magnetic fields, a problem which must be considered when using PMTs. However, Ge devices do have very significant disadvantages, including a requirement that they be cooled to temperatures below 100° K for proper operation and for insuring adequate resistance to radiation damage.

There are areas of investigation aimed at finding solid state alternatives to replace the PMT in gamma-ray spectrometry. Silicon PIN semiconductor detectors have been studied for this application. The performance of large-area Si-PIN photo detectors in combination with scintillators is limited by their relatively high detector capacitance, which increases with the area of the detector, and a large leakage current which increases with the Si volume of the device. Enlarging the area of these devices above 200 mm$^2$ results in severe performance penalty due to the increased electronic noise [James et al 1992]. In view of the maturity of Si technology, it is difficult to expect dramatic breakthroughs in achievable active area and depletion thickness.

Silicon avalanche photodiodes (APD's) produced high expectations as a solid-state replacement for the PMT [McIntyre 1966, Webb et al 1974, Entine et al 1983, Iwanczyk 1991, James et al 1992]. However, even though good results continue to be reported [Moszynski 1998], reliability is a major obstacle, and availability of commercial large-area (>200 mm$^2$) devices for this application are still not feasible.

A scintillation detector based on CsI(Tl) scintillation crystals coupled with HgI$_2$ photodetectors has produced excellent results for volumetric scintillators for high energy gamma-rays [Wang, Patt & Iwanczyk 1994]. However, there is currently a lack of availability of HgI$_2$ crystals of sufficient quality and area to be suitable for photodetector fabrication.

A new photodetector device, the silicon drift photodetector (SDP), is derived from the silicon drift particle detector (SDD) [P. Rehak U.S. Pat. No. 4,688,067] which historically has been linked to the charge coupled device (CCD) and was first implemented for detection and tracking of high energy particles [W. Chen, H. Kraner, Z. Li, P. Rehak, E. Gatti, A. Longni, M. Sampietro, P. Holl, J. Kemmer, U. Faschingbauer, B. Schmitt, A. Woner and J. P. Wurm, IEEE Trans. Nucl. Sci. Vol. 39, No.4,1992,619].

SDD structures have also been used for x-ray spectroscopy [G. Bertuccio, A. Castoldi, A. Longoni, M. Sampietro & C. Gautheir, Nucl. Inst. & Meth. Phys. Res. A312 (1992) 613; J. S. Iwanczyk, B. E. Patt, et. al. "Simulation and Modeling of a New Silicon Drift Chamber X-ray Detector Design for Synchrotron Radiation Applications", Nucl. Instr. & Meth. in Phys. Res. A380 (1996) 288–294; J. Segal, J. Plummer, B. E. Patt, J. S. Iwanczyk, and G. Vilkelis, "A New Structure for Controlling Dark Current Due to Surface Generation in Drift Detectors," manuscript in preparation; J. Segal, C. Aw, J. Plummer, C. Kenney, S. Parker, B. E. Patt, J. S. Iwanczyk, and G. Vilkelis, "A Vertical High Voltage Termination Structure for High-Resistivity Silicon Detectors," Submitted to IEEE Nucl. Science Symposium and Medical Imaging Conference, 1997 [2] J. S. Iwanczyk, B. E. Patt, C. R. Tull, C. Kenney, J. Segal, J. Bradley, B. Hedman, & K. Hodgson, "Large Area Silicon Drift Detectors for X-Rays—New Results," Submitted to the 1998 IEEE Nuclear Science Symposium, Toronto, Canada, Nov 12–14, 1998].

Recently SDD structures for detection of light (hereinafter referred to as Silicon Drift Photodetectors (SDPs)) have also begun to appear. These include structures described by Hartman [Hartman, R., Struder L., Kemmer J., Lechner P., Lorenz E., & Mirzoyan R. Nuclear Instruments and Methods in Physics Research A387: 250–254 (1997); Olschner [Olschner F. IEEE Trans. Nucl. Sci. NS-43(3):1407–1410, (1996)] and Fiorini [Fiorini C., Perotti F., and Labanti C., IEEEE Transactions on Nuclear Science, V45, No3: 483–486 (1998)]. However, none of the Silicon Drift Photodetectors or combination of scintillator with the Silicon Drift Photodetector described were optimized, as they have not recognized nor taken into account the criteria of the present invention. Thus it is desirable to provide a means for implementing radiation detectors using scintillators with semiconductor drift photodetectors wherein the components are specifically constructed to achieve the best signal-to-noise ratio.

Radiation imaging systems typically are used to generate images of the distribution of radiation either transmitted through an object or emitted by an object. These images can be used to determine the structure and function of internal organs. The radiations are not of themselves visible to the naked eye. In emission imaging ("Nuclear Medicine"), radiation invisible to the naked eye is generated within an organ by radiopharmaceutical or other radiation bearing substance which passes through or in some cases is designed to accumulate within the organ.

Prior emission imaging applications include single photon planar imaging and Single Photon Emission Computed Tomography (SPECT) for imaging the structure or function of internal organs. Anger introduced one system which has remained largely unchanged since it was first described in the 1950's (Anger, HO "Scintillation camera," Rev. Sci.

Instr. 29, 27. 1958; Anger, HO "Scintillation camera with multichannel collimators," J. Nucl. Med. 5, p515–531. 1964). These Anger-type gamma-ray cameras employed in single-photon emission imaging applications typically have a shielded enclosure, preferably made from lead or similar materials. Incident gamma-rays pass through the parallel-hole collimator which "focuses" the gamma-rays. The collimator limits the system sensitivity for typical medical imaging applications. Gama-rays received through the collimator enter a large scintillation crystal (typically NaI[Tl], CsI[Tl] or CsI[Na]), generating light photons which pass through an optical diffuser to neighboring photomultiplier tubes. The light photons are guided through the scintillator and the optical diffuser using reflectors along the sides of the scintillator and diffuser. The light photons strike an array of the photomultiplier tubes, each of which is between 1 inch and 2 inches in diameter, and signals pass to analog electronics which perform the position arithmetic and spectrometric functions. A device can be used to display the acquired images. Below the photomultiplier tubes is a position/pulse-height module (Webb S, In "The Physics of Medical Imaging," Adam Hilger, Bristol, England p161 1996).

A second type of emission imaging in Nuclear Medicine is dual photon imaging, such as Positron Emission Tomography (PET). Positron Emission Tomography systems typically are used to generate images of the distribution of positron emitting radiopharmaceuticals or other positron radiation bearing substances in the body. This is done by locating the origin of radiation caused by annihilation of the positrons. In PET, two coincident and oppositely traveling gamma-rays, each with energy of 511 keV, are produced by positron annihilation in the tissue of the organ being imaged.

The advantage of this type of imaging system is that the sensitivity can be significantly better than a collimator-based system because no collimator is required to determine the origin of the gamma-rays. Instead, the origin of the event is determined in the following way: The two gamma-rays resulting from the positron annihilation are detected in coincidence and the origin of the event is then known to lie along a line joining the collected gamma-rays. The precise location in space and the accurate timing of the arrival of the gamma-rays is critical so that they can be correlated in time with the annihilation event.

In order to perform the measurement at high spatial resolution, the typical PET system consists of rings of many small closely-packed detectors that surround a cross section of the body. The detector is used to measure a radiation which propagates from an organ through the rest of the body, the air, and any other medium between the body and the detector until it impinges on the detector. The radiation interacts with the detector to generate electrical signals representative of the detected radiation. The electrical signals can then be processed to generate an image on a video display device such as a computer monitor.

One method of generating electrical signals from detected radiation uses a scintillator and a photodetector. The scintillator is composed of a material that absorbs radiation of specified energy (e.g., gamma radiation of, for example, 511 keV) and converts it to visible light. The photodetector, in turn, converts the light emitted by the scintillator into electrical signals. This method is discussed in Chapters 8–10 of a book titled "Radiation Detection and Measurement, 2nd Edition" by Glenn F. Knoll, published in 1989 by John Wiley and Sons, Inc.

In order to accurately locate an event, the detector must completely absorb the 511 keV gamma-ray energy in a small volume. If absorption is only partial, the gamma-ray can deposit energy in more than one crystal, making the location ambiguous. If this happens, the events are usually discarded, resulting in lower instrument sensitivity.

Typically, when taking a PET image, there are millions of 511 keV photons striking the PET detectors per second, and it is the task of the PET system to identify which pairs of photons correspond to the same positron annihilation (this defines a ray or line of response through the body along which the annihilation occurred). The selection is done by choosing only those events that occur simultaneously (typically less than 12 nanoseconds). Thus, the detector must be dense, with a high effective atomic number, and have a very fast signal.

Inorganic scintillation detectors have these characteristics and are typically coupled to photomultiplier tubes (PMTs) that convert scintillation light from the 511 keV photon absorption into useful, fast signals for the PET systems.

Early PET systems had relatively large detectors discretely coupled to PMTs, providing a simple high performance solution for low resolution PET systems with relatively few detectors per ring [Hoffman E J, et al. J Nucl Med. 17:493–502, (1976)].

A more recent solution that has dominated PET detectors for several years, is a 2-D matrix of scintillators coupled to a 2 by 2 array of PMTs [Casey M E, et al. IEEE Trans Nucl Sci, NS-33:460–463, (1986); Cherry S R, et al. IEEE Trans. Nucl. Sci. NS-42:1064–1068, (1995)]. This solution was attractive in that it cost less (fewer and less expensive PMTs), and it produced better spatial and energy resolution with better coincidence timing.

A number of devices were built to avoid the use of the PMT entirely. One of the earliest candidates, the multiwire proportional chamber [Townsend D, et al. IEEE Trans. Nucl. Sci. NS-27(1):463–70, (1980)], had very high spatial resolution, and was less expensive than other types of PET systems. Unfortunately, the sensitivity for 511 keV photons was too low, and attempts to improve the sensitivity led to very poor coincidence timing.

Recently, liquid Xenon multiwire drift chambers have been considered for PET [Chepel VY, et al. Nucl. Instr. Meth. A367:58–61, (1995)], and while the performance characteristics in terms of spatial and timing resolution have been impressive, the need for cryogenics and the low stopping power of the liquid xenon for the 511 keV photon will likely limit this technology's role in PET.

Another technique uses a barium fluoride scintillation crystal, whose UV photons are in turn detected and positioned by a wire chamber with TMAE fill gas [Suckling, J, et al. Nucl. Instr. Meth. A310:465–70, (1991)]. Although various aspects of this technology have excellent performance, barium fluoride has low stopping power for 511 keV gamma-rays.

The use of solid state detectors with scintillators has been attempted by a number of groups. The earliest attempts used individual solid state detectors, attached to a matrix of scintillation crystals in turn coupled to a single PMT for energy measurement and timing, to locate the correct crystal of interaction.

In the earliest work, solid state mercuric iodide photodetectors were investigated for this purpose [Barton J B, et al. IEEE Trans. Nucl. Sci. NS-30:671–675, (1983); Dahlbom M, et al. IEEE Trans. Nucl. Sci. NS-32:533–537, (1985)], and this work was soon followed by employing silicon PIN diodes [Derenzo S E, et al. IEEE Trans. Nucl. Sci. NS-30 (1):665–70, (1983); Moses W W, et al. IEEE Trans. Nucl.

Sci. NS-40(4):1036–40, (1993); Moses W W, et al. Nucl. Instr. Meth. A352:189–94, (1994); Moses W W, et al. IEEEE Trans. Nucl. Sci. NS-42(4):1085–9, (1995)]. This concept was generally thought to add complexity to the PET system with only modest improvement in performance. One drawback of these devices was that the solid state component lacked the timing capability needed for PET. Thus they were used only for localization in space, and a PMT had to be used in conjunction with the solid state detector to obtain the timing component of the measurement.

Some efforts have been placed on development of solid state detectors capable of providing both the spatial and timing capabilities needed. The most promising of this type of solid state device for PET had been the Avalanche Photodiode (APD). However, to date, its success has been moderate. Lecomte et al. [Lecomte R, et al. IEEE Trans. Nucl. Sci., NS-32(1):482–6, (1985); Lecomte R, et al. IEEE Trans. Nucl. Sci. NS-43(3): 1952–1957, (1996)] have been developing APD-based PET systems since 1985.

One such device employed "reach through" type APDs, using one APD per bismuth germanate (BGO) crystal.

Early timing measurements gave FWHM resolutions of about 30 ns for APD-BGO in conjunction with a plastic scintillator [Melcher C L, et al. IEEE Trans. Nucl. Sci. NS-39(4):502–5, (1992)], which means that an APD-APD system would have a resolving time on the order of 45–50 ns, compared to the less than 12 ns timing window for PMTs. Eventually, this APD-APD system gave 20 ns FWHM timing resolution with 20 to 40 ns timing windows. The poor timing is due to low light yield from BGO, which is 10–15% of NaI(Tl), and is also due to the long decay constant (300 ns).

Recently, SDP structures were described for this application by [Avset B S, et al. Nucl. Instr. Meth. A288:131–136, (1990) and Olschner F. IEEE Trans. Nucl. Sci. NS-43(3):1407–1410, (1996)]. However, these SDPs do not address the PET application and do not have the necessary characteristics in terms of charge collection and timing to be useful for a PET application.

These prior SDP designs focused on the reduction of electronic noise by minimizing device capacitance at the expense of the electric field. The weak electric field results in a significant increase in charge collection time, which is unacceptable for PET timing requirements. One example is the structure described in [Olschner F. IEEE Trans. Nucl. Sci. NS-43(3):1407–1410, (1996)], where the photosensitive surface is biased only from strip side by means of a punch-through effect. The weak electric fields and long transit times for electrons lead to very poor timing characteristics, and the devices reported to date have had no practical use for timing applications such as positron emission coincidence. Instead, they were intended to be applied as a simple position sensing device (not coincidence sensing) used in conjunction with PMTs.

Lutetium orthosilicate (LSO) is a new scintillator [Holl I, et al. IEEE Trans. Nucl. Sci. NS-42(4):351–6, (1995)] that almost matches the stopping power of BGO, but has more light output than BGO (75% of NaI(Tl)) and a shorter decay constant (12 and 42 ns). LSO has been shown to give timing resolutions on the order of 2.6 ns [Holl I, et al. IEEE Trans. Nucl. Sci. NS-42(4):351–6, (1995); Schmelz C, et al. IEEE Trans. Nucl. Sci. NS-42(4):1080–4, (1995)], and is a very promising new development for the advancement of PET.

SUMMARY OF THE INVENTION

Radiation detectors according to one embodiment of the invention are implemented using scintillators combined with a semiconductor drift photodetectors wherein the components are specifically constructed in terms of their geometry, dimensions, and arrangement so that the scintillator decay time and drift time in the photodetector pairs are matched in order to achieve the best signal-to-noise ratio. Thus, the radiation detector of the present invention may include a scintillator having an exit window, the cross section of the exit window substantially matched to the cross section of an entrance window of an optically-coupled silicon drift photodetector; the silicon drift photodetector having dimensions and an electric field distribution creating a time spread of a signal generated in the silicon drift photodetector substantially matching a decay time of the scintillator. In addition, the detector may include electronics for amplification of electrical signals produced by the silicon drift photodetector, the amplification having a shaping time optimized with respect to the decay time of the scintillator and time spread of the signal in the silicon drift photodetector to substantially maximize the ratio of the signal to the electronic noise.

BRIEF DESCRIPTION OF THE DRAWINGS

The above and other features of the present invention may be more fully understood from the following detailed description, taken together with the accompanying drawings, wherein similar references refer to similar elements throughout and in which.

DETAILED DESCRIPTION OF THE PREFERRED EMBODIMENTS

Although detailed illustrative embodiments are disclosed herein, other suitable structures and machines for practicing the invention may be employed and will be apparent to persons of ordinary skill in the art. Consequently, specific structural and functional details disclosed herein are representative only; they merely describe exemplary embodiments of the invention.

Figure 1:
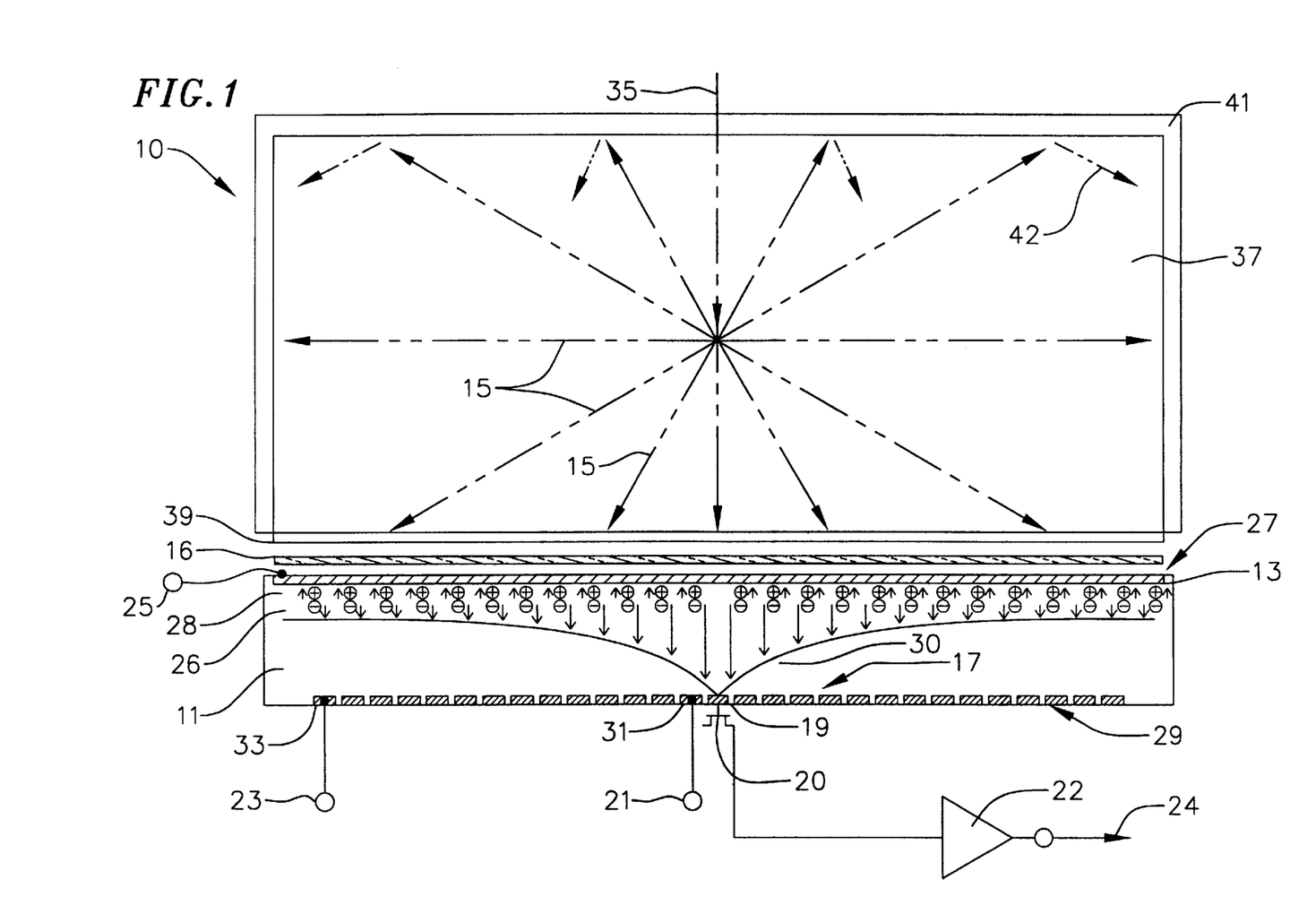
FIG. 1 is a diagrammatic representation of a gamma-ray detector constructed according to one embodiment of the present invention.

The configuration of a gamma-ray detector 10 is shown in FIG. 1. An entrance electrode 13 at the front surface of a Silicon Drift Photodetector (SDP) 11 consists of a thin (under 1 micrometer) rectifying junction or junctions which are semi-transparent to scintillation light 15 in order to have high quantum efficiency at the wavelength of the scintillation light 15 and may include an anti-reflective coating to minimize light reflection from the surface. The SDP can be made of high resistivity silicon. An entrance window, transparent window, or coupler 16 can be used for optically coupling the SDP to a scintillator 37. A back surface 29 of the SDP 11 contains a structure of steering electrodes 17 consisting of concentric rings each forming a rectifying junction and at the center of the concentric rings is a small (<100 micron diameter) ohmic contact 19. Attached to the ohmic contact 19 are electronics for amplification of electrical signals produced by the SDP 11 including a first stage transistor 20 electrically connected to a charge amplifier 22, which in turn leads to a spectroscopy amplifier 24.

Bias voltages are applied to the rectifying contacts on the major opposing surfaces, causing majority carriers 26 to separate from minority carriers 28. The bias voltages applied to the major opposing surfaces cause the bulk of the detector to be fully depleted, producing a parabolic-shaped potential valley within the detector from front surface 27 to back surface 29. A bias voltage circuit is used to apply predetermined voltages 21, 23, and 25 to the front and back surfaces 27 and 29 and to effect a radial potential gradient across the back surface 29 of the detector 11 (with increasing potential from the outer edge toward the center). The radial potential gradient tilts the potential valley, which becomes a drift valley 30 along the detector 11 toward the ohmic contact point 19 as shown in FIG. 1. The detector structure thus focuses the charge collection to the small ohmic contact 19 with an induced signal occurring predominantly between the central ohmic contact 19 and an inner steering electrode 31. In the type of structure depicted in FIG. 1, the device capacitance is minimized (60–100×10$^{-15}$ F) and is independent of the detector size because the collection contact 19 can be very small.

The low capacitance results in low series noise independent of detector area. When the detector capacitance is matched in the external circuit the overall electronic noise of the system is lowered compared with one that has a larger input capacitance. The electronic noise, related to the detector and input amplification, is due to four main sources 1) series "white" noise, 2) parallel "white" noise, 3) excess "1/f" noise, and 4) generation-recombination noise caused by traps present in the gate depletion region of the input field-effect transistor. The noise power can be written in terms of the full-width at half of the maximum height (FWHM) of the photopeak, and is given by [Iwanczyk & Patt 1995; Iwanczyk, Patt et al 1996]:

$$\Delta E_n = 2.355 \frac{w}{e} \left\{ \left[ qI'_L + \frac{2kT}{R'_p} \right] \langle N_p^2 \rangle + \right.$$

$$\left. 2kTR'_s C_{in}^2 \langle N_s^2 \rangle + A_{1/f} \langle N_{1/f}^2 \rangle + BC_{in}^2 \langle N_{g-r}^2 \rangle \right\}^{\frac{1}{2}} \quad (1)$$

where $\Delta E_n$ is the linewidth (FWHM) due to the electronic noise (in eV), and e is the electron charge.

Figure 2:
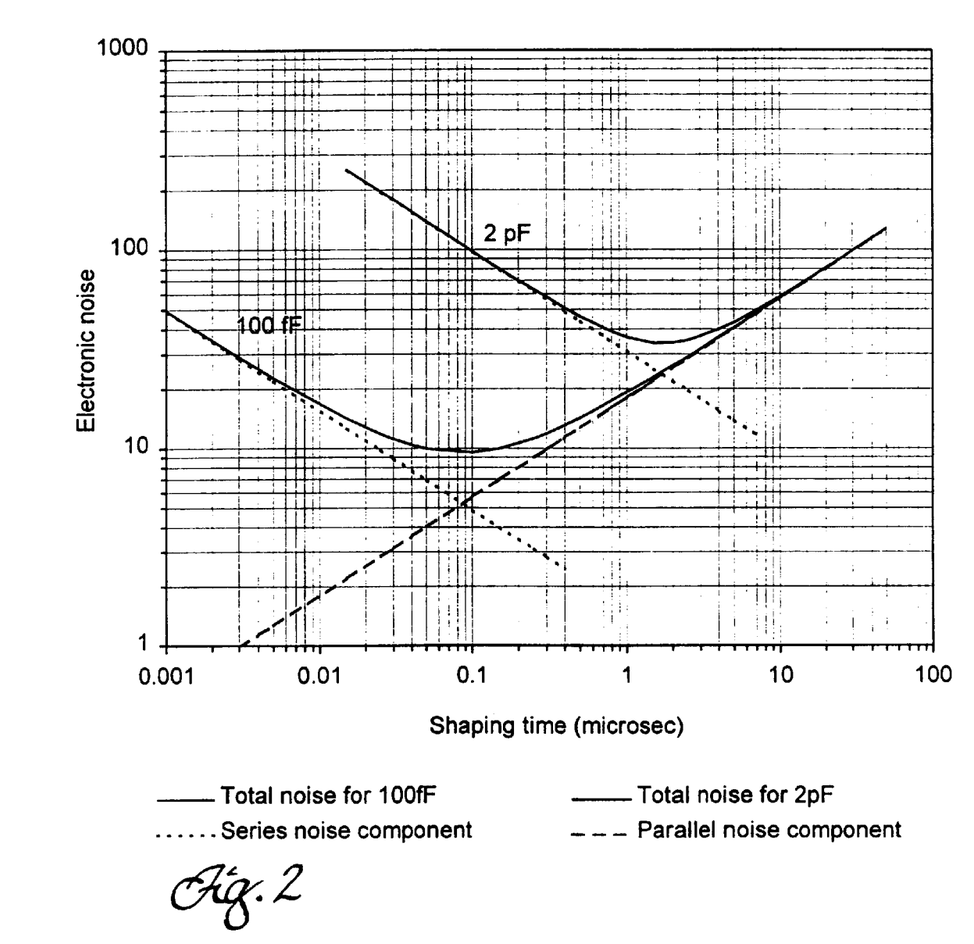
FIG. 2 is a graph showing the electronic noise of the structure of FIG. 1 as a function of amplifier shaping time for a particular capacitance relationship.

FIG. 2 shows the electronic noise as a function of amplifier shaping time for the case when the detector and the input capacitance ($C_d$ and $C_{in}$ respectively) are each 100×10$^{-5}$ F and for the case when the detector and the input capacitance are 20 times greater, i.e. 2×10$^{-12}$ F. Detector leakage current ID=40 pA, FET gate current Ig=0.2 pA, parallel resistance Rp=10$^{15}$, transconductance gm=0.7 mS, FET series noise resistance Rs=0.67/gm, detector series noise resistance Rsd= 1, and mean energy to create an electron hole pair w=3.6 eV (Si). A value of approximately 2.8 e$^-$RMS was used for the excess 1/f noise due to the FET, the generation-recombination noise was ignored, and triangular shaping was assumed. The advantage of lower capacitance in terms of decreased noise is significant only for amplifier shaping times below about 1 microsecond. Thus, the full advantage of the lower capacitance of the SDP is realized only when an amplifier shaping time of less than 1 microsecond can be employed. Furthermore, on the basis of these arguments it is made clear that the optimum shaping time from the noise point of view is typically as low as 50 ns–100 ns for a SDP.

Signal reduction due to ballistic deficit will occur if the time spread in the charge collected in the SDP is greater than the amplifier shaping time [JS Iwanczyk and BE Patt, "Low Noise Electronics for X-Ray and Gamma-ray Spectrometry", chapter 14 in Semiconductor for Room Temperature Nuclear Detector Applications, MRS Volume #43 for Semiconductors and Semimetals Series, editors: Schlesinger, T. E., and James R. B., Academic Press (1995)]. Thus, the timing of the SDP is a key factor in its optimal operation from the point of view of the signal as well as the noise. Fast timing is also required when expected event rates are high and when applications require determination of coincidences between gamma-rays as in positron emission tomography (PET). In these cases fast (rise time and decay time), intense pulses are desired.

In order to achieve the minimum drift time for the majority carriers, and fastest operation of the SDP, the applied bias must be given by $\Psi(x,y,z)=f(r)$ where $r^2=x^2+y^2$, and f(r) is a monotonically increasing function of r [E. Gatti and P. Rehak, Nucl. Instr. and Meth. in Phys. Res. 225 (1984) 608]. This potential is realized by concentric steering electrodes with a monotonically increasing potential from the inner steering electrode 31 to an outer steering electrode 33. A circular drift detector with the concentric circular steering electrodes 17 achieves the required biasing. A hexagonal drift detector with concentric hexagonal steering electrodes is a good approximation to the required biasing. For arrays of photodetectors the hexagonal geometry achieves a better packing density with less dead space between elements of the array than the circular geometry. A square or rectangular drift detector with concentric square or rectangular steering electrodes is a good approximation to the required biasing. For arrays of photodetectors coupled to arrays of scintillators the square or rectangular geometry has advantages in the manufacturability and packaging of the scintillator arrays compared with a circular geometry.

The drift velocity for electrons moving a distance $\Delta x$ through a potential drop of $\Delta V$ along the drift path is $$v_{drift} = \mu \frac{\Delta V}{\Delta x} \quad (2)$$

where $\mu$ is electron mobility and the maximum drift time (corresponding to interactions at the edge of the detector) along the drift path is $$t_{drift} = \sum_r \frac{\Delta x^2}{\mu \cdot \Delta V} \quad (3)$$

This expression is minimized for equivalent intervals $\Delta V$ along the drift path. This means that the minimum drift results when the electric field is constant along the drift path. However, we note that applying a linear potential to the back surface of the detector does not result in a linear drift field along the drift path. In fact, the potential valley bottom in this case would be a straight line touching the front surface near the detector edge and touching the anode at the SDP center. In this case $E_{drift}$ will be far from homogeneous, becoming too low near the edge, which would make the electron cloud drift too slowly for the light interactions near the SDP edges and thus incoming signal width too large. The question is then, how to bias the detector surface in order to achieve a constant drift field.

Assuming that the full depletion voltage ($V_{dep}$) 25 is applied to the front side 27 of the detector, the applied backside voltage should step from close to zero near the center to some $V_{max}$ 23 at the edge. Furthermore, we must determine the correct intervals for the steps. We wish to maximize $V_{max}$ in order to effect the highest electric fields and shortest transit times. However, $V_{max}$ is limited by $V_{max} \leq 2 \cdot V_{dep}$ in order to prevent punch-through. In fact, $V_{max}$ must be considerably lower than this limit 1) in order to prevent breakdown between the rings 17 and 2) for the following reasons.

For a given backside surface potential $V_{back}$ and front-side voltage $V_{dep}$, the minimum potential at radius x from a 1-D solution of Poison's equation is $$\phi_{min}(x) = V_{back}(x)\left[1 - \frac{\frac{1}{4} \cdot V_{back}(x)}{V_{dep}}\right] \quad (4)$$

and the resulting drift field is $$E_{drift} = -\frac{d}{dx}(\phi_{min}) = \frac{d}{dx}V_{back}(x)\left[\frac{\frac{1}{2} \cdot V_{back}(x)}{V_{dep}} - 1\right] \quad (5)$$

If a constant drift field is achieved, then that field will be given by $$E_{drift} = \frac{1}{r} \cdot V_{max}\left[1 - \frac{1}{4} \cdot \frac{V_{max}}{V_{dep}}\right] \quad (6)$$

In practical terms, $V_{max}$ must be significantly less than 2 $V_{dep}$ because as the backside voltage approaches this limit, the necessary applied voltage gradient becomes infinite. From the equation above, it can be seen that $V_{dep} < V_{max} < 1.5$ $V_{dep}$ is a reasonable value, because for higher values the drift field does not increase much, while the applied gradient at the edge of the detector rises sharply. Reasonable values are 300–500 $\mu$m thick silicon of resistivity 2 k$\Omega$-cm to 3.5 k$\Omega$-cm. $V_{dep}$ will range from about 90V for 300 $\mu$m thick silicon and 3.5 k$\Omega$-cm resistivity up to about 500 V for 500 $\mu$m thick silicon and 2 k$\Omega$-cm resistivity. The resulting voltage drop between the successive outer steering electrodes should remain below about 15 V in order to not cause breakdown between the rings.

Figure 3:
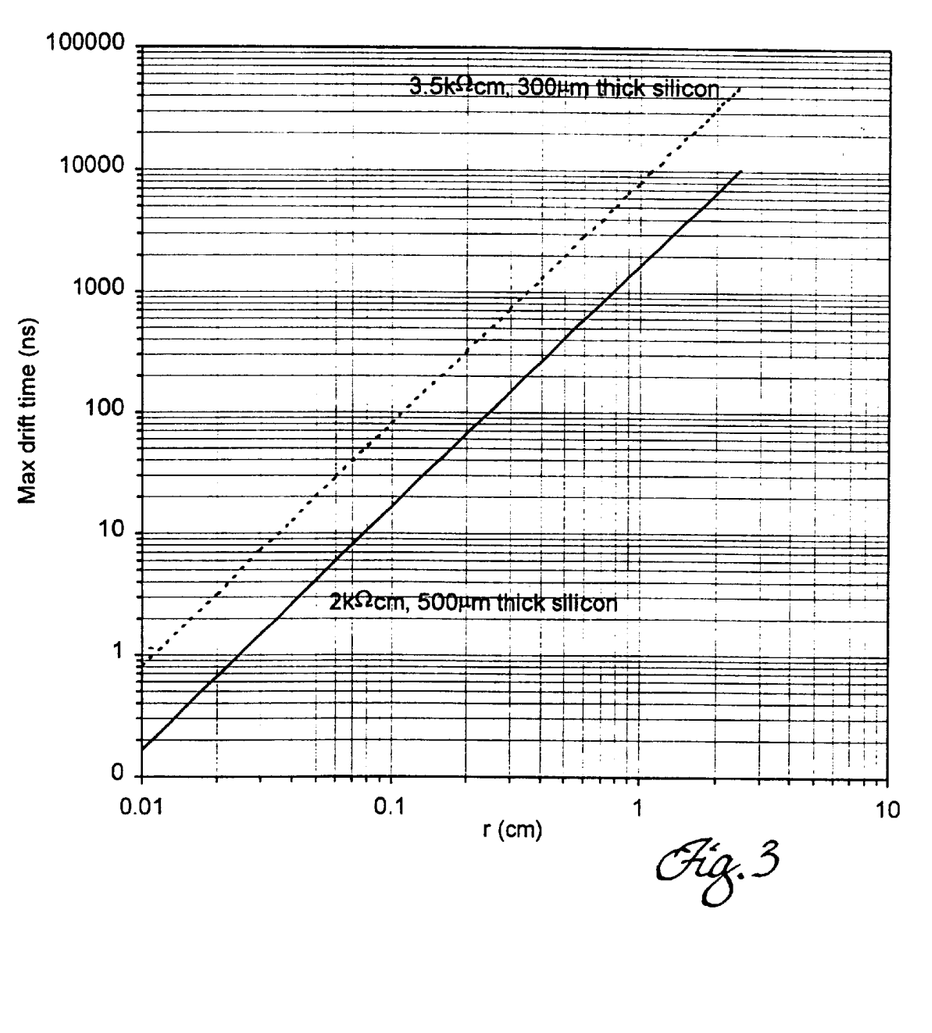
FIG. 3 is a graph showing drift times for various radii of the Silicon Drift Photodetector of FIG. 1.

When the detector is operated within the above range of conditions the maximum carrier transit time $t_{max}$ corresponding to the time it takes for carriers generated at the edge of the detector to arrive at the ohmic contact will range from about 20 ns for a 1 mm radius SDP to over 1 $\mu$s for a 1.5 cm radius SDP. The drift times for various radii of the SDP are shown in FIG. 3. The range of values falls between the two lines (one dashed and one solid line in FIG. 3). The dashed line represents 3.5 k$\Omega$-cm silicon of 300 micron thickness which leads to a carrier drift velocity of approximately $1.25 \times 10^6$ cm/sec and the solid line is 2 k$\Omega$-cm silicon of 500 micron thickness with corresponding carrier drift velocity of approximately $6 \times 10^6$ cm/sec. Lower resistivity and greater thickness lead to higher depletion voltage and larger electric fields which produce greater drift velocity. However, these parameters are limited by constraints on the maximum voltage between the adjacent steering electrodes due to the potential for breakdown between them.

When a gamma-ray 35 or x-ray impinges on the scintillator 37 of the type shown in FIG. 1, and interacts within it, the absorption of the ionizing radiation leads to emission of a large number of light photons 15 through the scintillation process as described by Rodnyi [P A Rodnyi, "Physical Processes in Inorganic Scintillators," CRC Press, 1997.] The light produced in this process radiates into $4\pi$ steradians from near each point of gamma-ray or x-ray interaction as shown in FIG. 1. The light propagates through the scintillator to emerge from the open end designated as a scintillator exit window 39. The light thus emerging is a pulse, which is spread in time.

The scintillator is typically packaged in such a way that the side that faces the photodetector is uncovered and is highly polished to maximize transmission of light. All other sides are covered with a reflective medium 41. Thus, with each gamma-ray interaction in the scintillator, light scatters from the reflective medium to emerge over the entire surface of the scintillator exit window 39. FIG. 1 shows scattered light 42 scattering from the scintillator sides. The number of generated photons 15 is a function of the energy of the incident gamma-ray 35 and the factors described below. The particular distribution of the light emerging from the exit window 39 of the scintillator is a function of the depth of the gamma-ray interaction in the scintillator, the scintillator type, and its shape and dimensions. It is also influenced by the preparation of the each of the surfaces of the scintillator. Typically, there is a measurable and significant amount of light that emerges over the entire area of the exit window 39.

The relative light output of the scintillator 37 is a material dependent parameter. It is usually listed as the number of photons produced per million electron volts (MeV) of incident energy. The relative light output of the scintillator 37 is a key factor in choosing which scintillator will be used for a given spectroscopy application as it is desirable to maximize the signal magnitude in order to achieve the highest signal-to-noise ratio in the measurement. The values of relative light output of various common inorganic scintillators are given in Table I.

The time spread of the light pulse emerging from the scintillator is predominantly a function of the decay constant of the scintillator which is a material dependent constant. This parameter is a key factor in choosing which scintillator will be used for a given application. The decay time values of various common inorganic scintillators are given in Table I.

TABLE I

Properties of selected inorganic scintillators [* are from PA Rodnyi, "Physical Processes in Inorganic Scintillators," CRC Press, 1997; + are from FIG. 3]

| Crystallic Material | Relative light output (ph/MeV) | Decay time (ns) | SDP radius for fast timing+ | Amplifier shaping time |
|---|---|---|---|---|
| NaI(Tl) | 38,000* | 230* | 1.5 mm–4 mm | ≧230 ns–3 μs |
| CsI(Tl) | 59,000* | 1100 | 3 mm–10 mm | ≧1100 ns–10 μs |
| CsI(Na) | 39,000* | 630* | 3 mm–6 mm | ≧630 ns–4 μs |
| Lu2SiO3 (Ce) | 30,000* | 40* | 0.6–1.8 mm | ≧40 ns–2 μs |
| BGO | 6,100 | 300 | 2 mm–4 mm | ≧300 ns–3 μs |

In order to maximize the signal-to-noise ratio of a scintillator/SDP pair, the scintillator must be chosen so that its decay time is less than or equal to the shaping time of the amplifier used. If this condition is not met the signal will be reduced by ballistic deficit as a result of incomplete collection of the scintillation light pulse.

Several embodiments (FIG. 4) are disclosed to match the timing parameters of the scintillator 37 with those of the SDP 11 to realize significant improvements in signal-to-noise ratio.

Figure 4A:
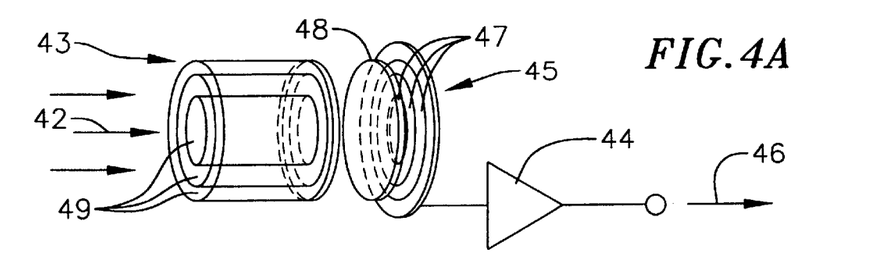
FIG. 4A is a diagrammatic representation of a gamma-ray detector constructed according to a first embodiment of the present invention.

The first embodiment of the present invention, which is shown in FIG. 4A, is characterized as a segmented scintillator/single SDP pair. Incident gamma-rays 42 strike a scintillator 43 which is divided into segments 49. The segments 49 can be round, square, or concentric rings. The scintillator 43 is optically coupled to the SDP 45 via an optical coupling or entrance window 48. The dimensions of the segments 49 are specified so that the envelope of the drift time for carriers originating in the SDP 45 from any area corresponding to a projection 47 of a segment 49 onto the Silicon Drift Photodetector are each on the order of ¼–⅕ times the decay time of the scintillator 43. Thus, the time spread of the signal produced in the SDP 45 is substantially matched to the decay time in the scintillator 43. Electrically connected to the SDP 45 are electronics for amplification of electrical signals produced by the SDP 45 including a charge amplifier 44 electrically connected to a spectroscopy amplifier 46. The amplification has a shaping time optimized with respect to the decay time of the scintillator 43 and the time spread of the signal in the silicon drift photodetector to maximize the ratio of the signal to the electronic noise. This first embodiment relates to radiation detection and, more specifically, to a radiation detection system for gamma-ray spectroscopy.

The type of structure in the first embodiment is necessary for coupling fast scintillators such as NaI(Tl) (230 ns decay) and LSO (40 ns decay) to large SDPs (diameter of 1–2 cm or greater). A specific case of this design would use a NaI(Tl) segmented scintillator with two to five concentric annular piped segments with 1.5 to 3 mm segment radii surrounding a 1.5 to 3 mm central cylindrically shaped segment. The desired length of the segments would effect the choice of the smallest radius in this range. Long thin scintillator crystals are generally undesirable because of the inherent light losses when the length to width ratio is too large. Using techniques outlined by M. P. Tornai, B. E. Patt, J. S. Iwanczyk, C. S. Levin, and E. J. Hoffman, in the paper titled "Discrete Scintillator Coupled Mercuric Iodide Photodetector Arrays for Breast Imaging", IEEE Trans on Nucl Sci. Vol. 44 No. 3 (1997) 1127, it can be determined that light is efficiently collected for up to about 6 mm long scintillators of 1.5 mm radius. The length can be extended to about 2 cm for 3 mm radius scintillators. These dimensions can be applied to the shaped segments described in the current invention. The maximum radius in the range is set by the considerations outlined in Table I. In addition if fast timing is required, low resistivity material (<3 k-ohm-cm) is desirable in order to increase the depletion voltages and the electric fields with the effect of faster charge collection. Additionally, in this design reflective media must be included between the adjacent segments to reflect the light back within the segment and ensure best transport of the light to the window so that it will couple into the Si-Drift PD. For NaI(Tl), which is hygroscopic, it is also necessary to ensure compatibility with hermetic mounting. Finally, minimal window thickness (between the scintillator and the SDP) is desirable to prevent the light from spreading outside of the desired radius.

In addition to the above design, square, rectangular and hexagonal segments with similar dimensions can be used. However, light can be trapped in the corners lowering the overall light output of the device. In addition, consideration must be taken of the additional drift time for signals originating in the corners of a square segment which is 1.4 times longer than the drift time of a circular segment that fits within a similarly sized square.

Figure 4B:
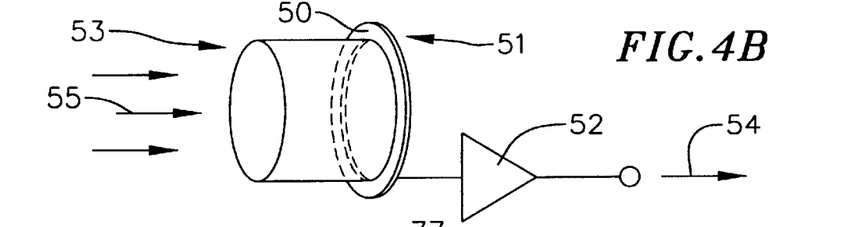
FIG. 4B is a diagrammatic representation of a gamma-ray detector constructed according to a second embodiment of the present invention.

The second embodiment of the present invention, which is shown in FIG. 4B, is characterized as a single scintillator/SDP pair comprising a SDP 51 whose dimension is specified so that the maximum drift time for carriers originating at the outer edge of the SDP 51 is on the order of ¼–⅕ times the decay time of a scintillator 53. Incident gamma-rays 55 strike the scintillator 53, which is optically coupled to the SDP 51 via an optical coupling or entrance window 50. Thus, the time spread of the signal produced in the SDP 51 is substantially matched to the decay time in the scintillator 53. Electrically connected to the SDP 51 are electronics for amplification of electrical signals produced by the SDP 51 including a charge amplifier 52 electrically connected to a spectroscopy amplifier 54. The amplification has a shaping time optimized with respect to the decay time of the scintillator 53 and the time spread of the signal in the silicon drift photodetector 51 to maximize the ratio of the signal to the electronic noise. This second embodiment relates to radiation detection and, more specifically, to a radiation detection system for gamma-ray spectroscopy.

The type of structure in the second embodiment is suitable for coupling slow scintillators such as CsI(Tl)(100 ns decay) to large SDPs (diameter of 0.5–2 cm). A specific case of this design is the use of a single cylindrically shaped CsI(Tl) scintillator of 0.5–2 cm. diameter coupled to a similarly sized SDP.

Figure 4C:
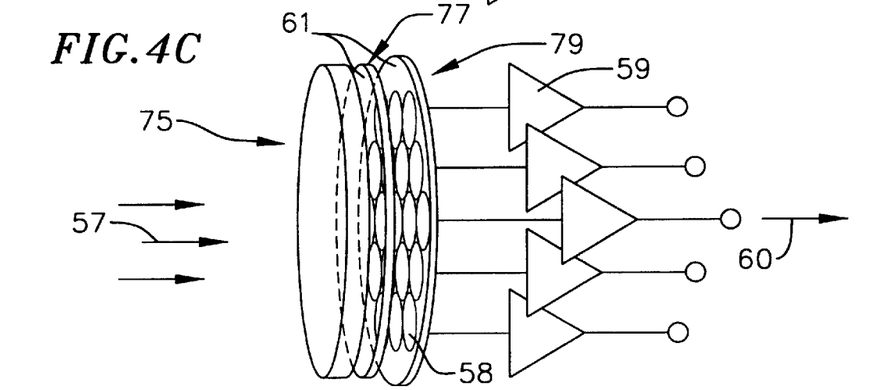
FIG. 4C is a diagrammatic representation of a gamma-ray detector constructed according to a third embodiment of the present invention.
Figure 5A:
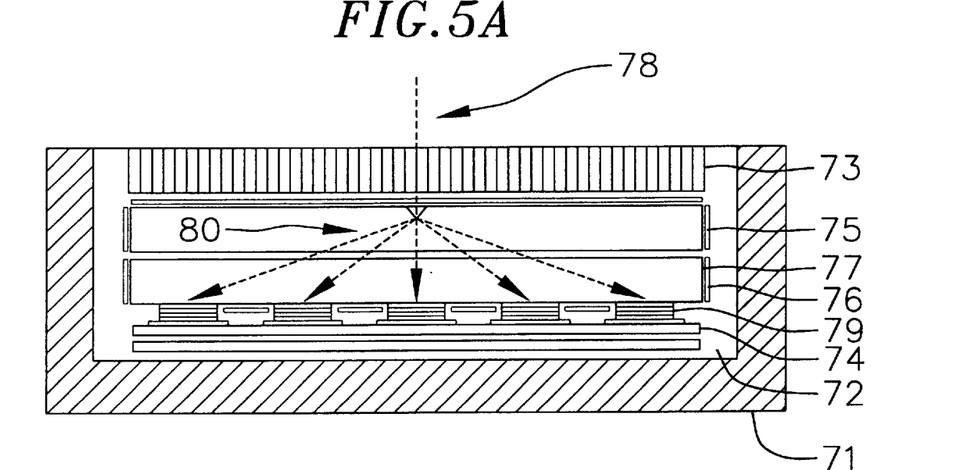
FIG. 5 is a diagrammatic representation of a scintillation camera of the Anger type, with light detectors shown in solid state form.
Figures 5B, 5C:
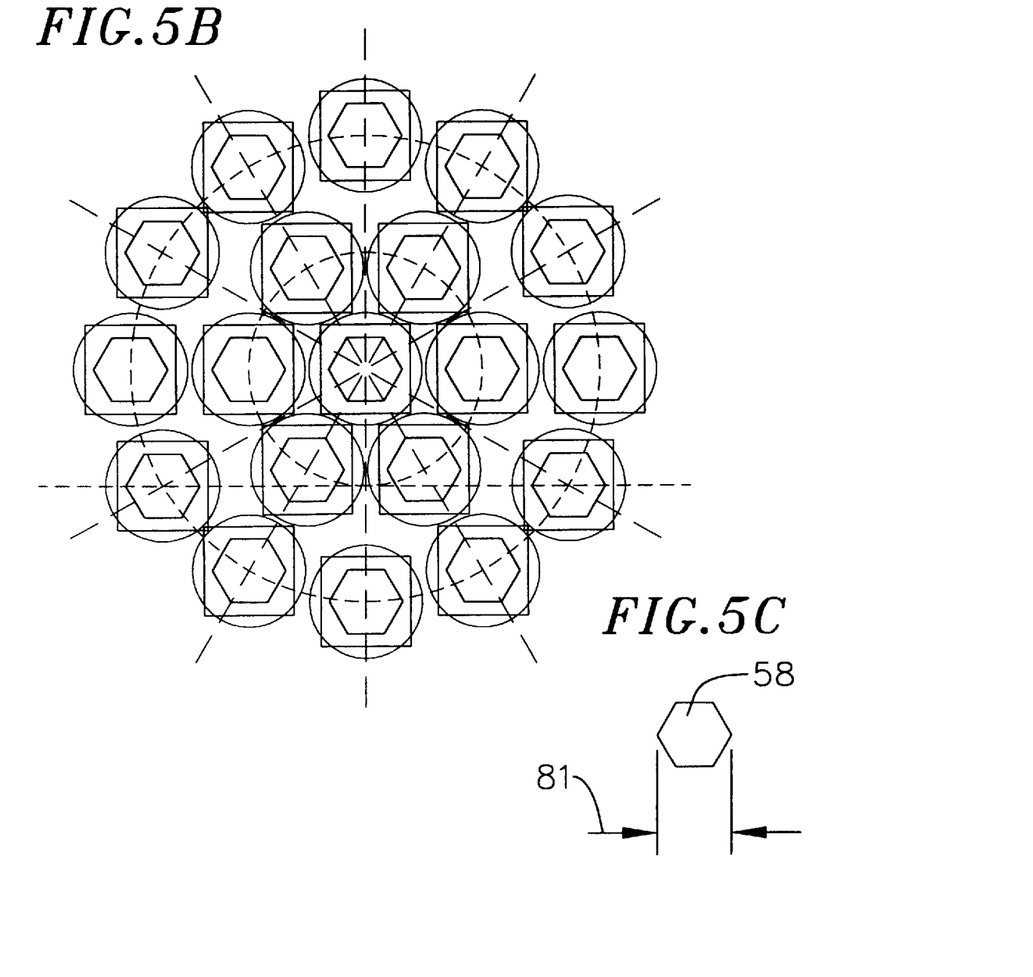

The third embodiment of the present invention is shown in FIG. 4C and FIG. 5. The imaging detector comprises a shielded enclosure 71 including a parallel-hole collimator 73 for "focusing" the gamma-rays, a large scintillation crystal 75 (typically NaI[Tl], CsI[Tl] or CsI[Na]), a light diffuser 77, an array of SDPs 79, each of which has a diameter 81 of 1–10 mm, and analog electronics which perform the position arithmetic and spectrometric functions. Incident gamma-rays 57 pass through a collimator 73 and strike a scintillator 75, generating light photons 80 which are guided by reflectors 76 to pass through an optical coupling or entrance window 61 and an optical diffuser 77 to enter SDP elements 58. The optical diffuser 77 causes a distribution of the light photons generated in the scintillator to neighboring pixels of the SDP array 79. The SDP elements 58 are fabricated on a substrate 74 which is above a position/pulse-height module 72. The position/pulse-height module 72 is an electronic decoder assisting in the determination of the gamma-ray interaction position through the relative pulse heights of the pulses generated in the individual SDP pixels. Each of the SDP elements 58 has its dimensions specified so that the maximum drift time for carriers originating at the outer edge of each SDP element 58 is on the order of $\frac{1}{4}$–5 times the decay time of the scintillator 75. Thus, the SDP elements 58 have dimensions and electric field distributions creating a time spread of signals generated in the elements 58 matching the decay time of the scintillator 75. Thus, scintillation material and the dimensions of the scintillator and silicon drift detector array elements are specifically chosen to optimize the timing and energy resolution characteristics of the imaging detector.

Electrically connected to the SDP array 79 are electronics for amplification of electrical signals produced by the SDP array 79 including charge amplifiers 59 electrically connected to spectroscopy amplifiers 60. The amplification has a shaping time optimized with respect to the decay time of the scintillator 75 and the time spread of the signal in the SDP elements 58 to maximize the ratio of the signal to the electronic noise. This third embodiment relates to radiation imaging and more specifically to a radiation imaging detector incorporating a collimator 73, a scintillator 75, an array of SDPs 79 and readout electronics.

The scintillator material can be CsI(Tl) because of its high light output and good spectral match to the SDP spectral response, NaI(Tl) because of its high light output and faster response, or one of the other scintillators for which typical specifications are listed in Table I.

The approach outlined in the present embodiment is superior to other approaches that have been used to attempt to accomplish this goal in the past.

Since the energy resolution of scintillation spectrometers depends primarily on the number of scintillation photons collected, the high quantum efficiency (90% for the SDP at 560 nm versus 30% for the PMT), high response uniformity (>99% for the SDP), and low electronic noise of the SDP provides better energy resolution than current technologies.

The spatial resolution of an Anger-type scintillation camera depends on the spacing between the photodetectors and the S/N of the photodetectors [Richardson R L, 1977; Sorenson J A, & Phelps M E, 1987]. Thus, the use of smaller devices (1–10 mm diameter SDPs compared with 1–2 inch diameter PMTs) coupled with the above-mentioned larger signal and lower variance in the signal provides improved spatial resolution.

Solid-state cameras can provide improved speed when used with fast scintillators such as LSO, YSO, YAP, etc.

The use of a 300 micrometer thick SDP rather than the photomultiplier tubes of Anger-type scintillation cameras leads to a more compact system with a reduction of shielding mass as shown in FIG. 5. This allows for the development of a truly portable scintillation camera that is less intrusive than current portable cameras. In addition to the obvious application in regular gamma cameras, this also allows for its use in surgeries to help locate lesion sites or in research applications, where the sheer bulk of current cameras remove them from consideration.

Solid-state photodetector signals are more naturally interfaced to the digital domain leading to:
a) Integrated/smart detectors with much more up-front processing capability resulting in improved performance.
b) Digital signal processing leading to improved energy performance afforded by more optimal signal shaping such as real-time adaptive filter pulse shaping which optimizes shaping time based on instantaneous throughput.
c) Higher throughput by replacing analogue "double-sided" pulse shaping with digital filters incorporating "single-sided" shaping and schemes such as adaptive shaping described above.

A reduction in cost for the overall gamma camera occurs due to the lower cost of high volume planar technology silicon processing compared with expensive PMT technology. With high-volume production this technology results in significant (3–5 times) reduction of cost compared with PMTs.

The invention of the third embodiment can also be compared with the following previous approaches.

1) PMT

As described above, the SDP approach has advantages in terms of performance, compaction, compatibility with digital techniques, and cost.

The SDP has no internal gain, therefore there is no process equivalent to photomultiplier pulse-height drift.

The SDP approach eliminates the need for gain balancing because the SDP is a unity gain device.

The SDP approach provides larger (due to higher Quantum Efficiency) and more uniform signal (due to technology).

2) Si-PIN

Si-PIN schemes do not have the possibility of taking advantage of the sparse readout schemes, such as Anger logic, due to very high noise for devices above a few square millimeters in area. Because of this, a readout channel through the shaping amplifier is needed for each pixel.

To optimize the spatial resolution one must use segmented scintillation crystals.

Because of the large number of channels of detector and preamp/shaper, the need for multiplexers, the complexity of the readout hardware, and the need for higher cost segmented scintillators, the cost of a full-size gamma camera based on Si-PIN detectors is not competitive with PMT based systems, and these cameras are better suited to specialty high resolution imaging such as mammoscintigraphy.

3) APDs

The avalanche structures are much more difficult to control in production than the drift detector structures. For this and other reasons, the devices still are not commercially available with sufficiently large areas (limited to<1 mm) and suffer from manufacturability and reliability problems, which have not been completely solved.

4) CZT

CdZnTe technology is still a very exotic material that is extremely expensive to produce and remains unproven in the commercial marketplace. Moreover, the medical applications demand performance at the limit of the capabilities of the material. The production yield for this quality is very low (in the low single digit percentages), and remains questionable that any supplier can meet realistic demands for the material.

The poor manufacturability of the material might be improvable, but because CdZnTe does not have exposure to the same market opportunity as silicon does, it does not have the resources available that Si has had to solve its basic problems.

Figure 4D:
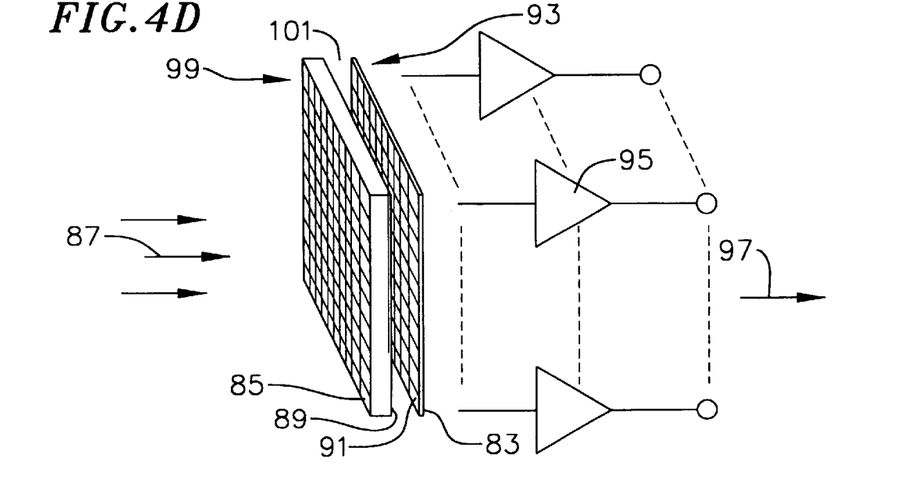
FIG. 4D is a diagrammatic representation of a gamma-ray detector constructed according to a fourth embodiment of the present invention.

The fourth embodiment of the present invention, which is shown in FIG. 4D, is characterized as an array of scintillator/SDP pairs formed from a LSO scintillator array 99 coupled to a SDP array 93. Each scintillator segment 85 of the scintillator array 99 is matched to an SDP element 83 to create scintillator/SDP pairs. The SDP array 93 is composed of a plurality of the individual elements 83 each with dimensions of 1–3 mm on a side. The scintillator segments 85 have exit windows 89 and the SDP elements 83 have entrance windows, transparent windows, or couplers 91 such that the cross sections of the exit windows 89 substantially match the cross sections of the entrance windows 91. Incident gamma-rays 87 impact the scintillator segments 85, generating light photons which leave the scintillator segments 85 through the exit windows 89. The photons pass through an optical coupling 101, through the entrance windows 91, and are detected by the SDP elements 83, which then produce electric signals. The dimensions of the SDP elements 83 are specified so that the maximum drift time for carriers originating at an outer edge of each of the SDP elements 83 is on the order of $\frac{1}{4}$–5 times the decay time of the scintillator segments 85. Thus, the SDP elements 83 have dimensions and electric field distributions creating a time spread of the signals generated in the elements 83 matching the decay time of the scintillator segments 85. Electrically connected to the SDP array 93 are electronics 95 for amplification of electrical signals produced by the SDP elements 83. Each of the scintillator/SDP pairs is electrically connected to a charge amplifier 95 which in turn is electrically connected to a spectroscopy amplifier 97. The amplification has a shaping time optimized with respect to the decay time of the scintillator segments 85 and the time spread of the signal in the SDP elements 83 to maximize the ratio of the signal to the electronic noise. This fourth embodiment relates to radiation detection and, more specifically, to a radiation imaging system for single-photon imaging or positron emission tomography (PET) incorporating the scintillator array 99 and the silicon drift photodiode (SDP) array 93.

The shape of the signal produced from the scintillator/SDP pair can be determined from the convolution of the functions describing the light output from the scintillator (a function of the scintillator decay constant and light transport efficiency from the scintillator to the photodetector) and the function describing the scintillation induced carrier transport in the photodetector. The mathematical convolution accounts for the fact that the charge signal is developed over the decay time of the scintillator [J B Barton, E J Hoffman, J S Iwanczyk et. al, "A High Resolution Detection System for Positron Tomography," IEEE Trans. Nucl. Sci. NS-30 No.1 (1983) 671.].

The light output from the scintillator is given by $$\left(1 - \frac{1}{\tau}\exp^{-\frac{t}{\tau}}\right),$$

and the signal due to carrier transport is approximated by $\alpha t^2$, where $\tau$ is the decay constant of the scintillator, and $\alpha$ is a normalization constant such that $\alpha t^2 = 1$ at the maximum transit time $t_{max}$ corresponding to the time it takes for carriers generated at the edge of the detector to arrive at the anode. With the correct SDP biasing as described above, the maximum carrier transit time $t_{max}$ will be about 20 ns–40 ns for a 0.5 mm–3 mm radius SDP.

Figure 6:
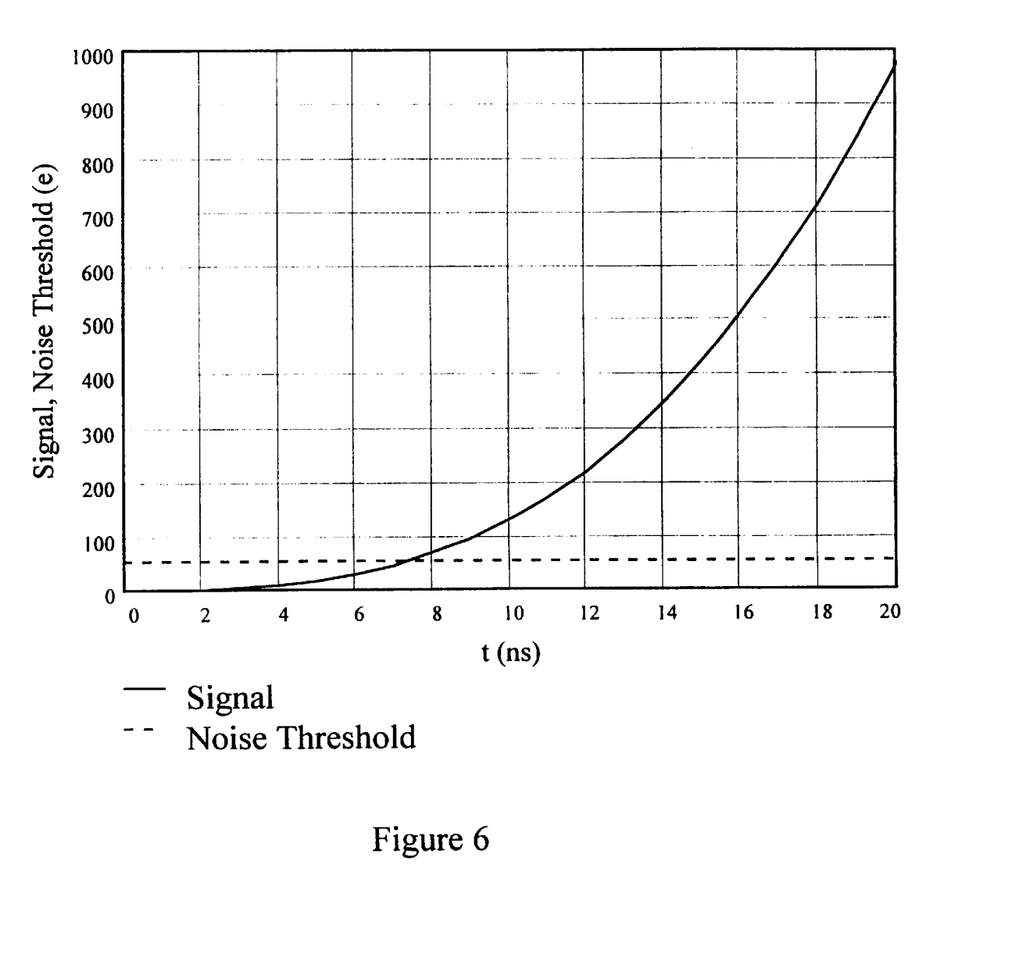
FIG. 6 is a graph showing the signal generated in the Silicon Drift Photodetector of FIG. 1 as well as the noise threshold.

After taking into account the scintillator relative light yield, $L_R$, quantum efficiency, Q.E., and any deterioration of light yield due to the modification of the scintillator geometry from the one used in obtaining the scintillator light yield values in table I, we obtain the following description of the signal generated in the SDP $$s(t) = c \cdot \tau^2 \cdot \left(\frac{t^2}{\tau^2} - 2\frac{t}{\tau} - 2e^{-\frac{t}{\tau}} + 2\right) \quad \text{for } t \leq t_{max} \quad (7)$$

where the constant $c=(E_y/1 \text{ MeV}) \times L_R \times Q.E. \times a$, and $a=1/(t_{max})^2$. The signal, s(t) generated from Eq. 7 is plotted in FIG. 6 together with the noise threshold approximated by $2.2 \times 2.35 \sigma_n = 5.17 \sigma_n$ which is approximately 50 e$^-$ (using the theoretical design value $\sigma_n=10$ e$^-$ RMS) obtained from FIG. 6. The signal is seen to cross the threshold (discriminator level) at approximately 7.5 ns.

Figure 7:
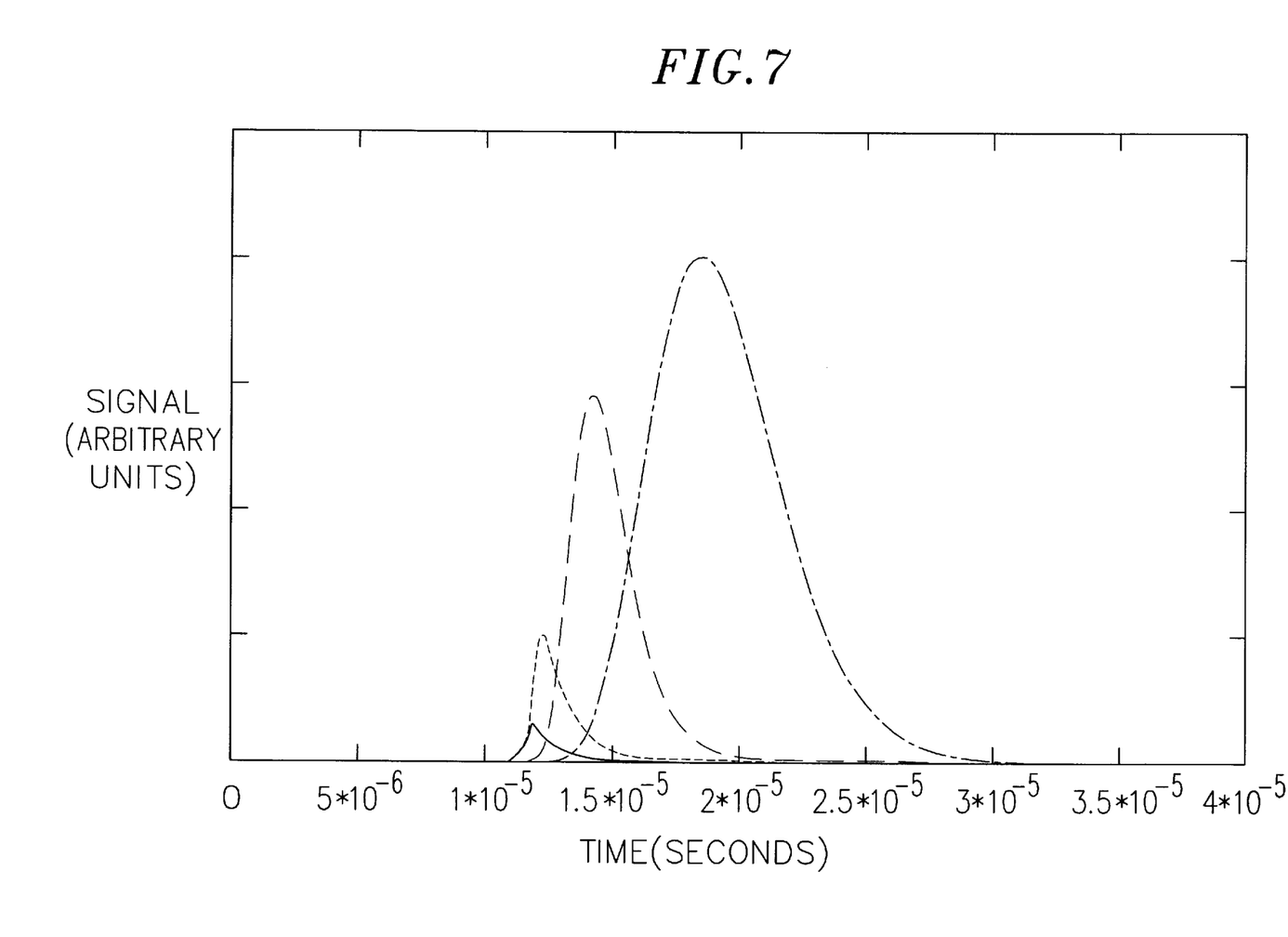
FIG. 7 is a graph of pulse shapes for a CSI(Tl) scintillator coupled to a Silicon Drift Photodetector for various shaping times.
Figure 8:
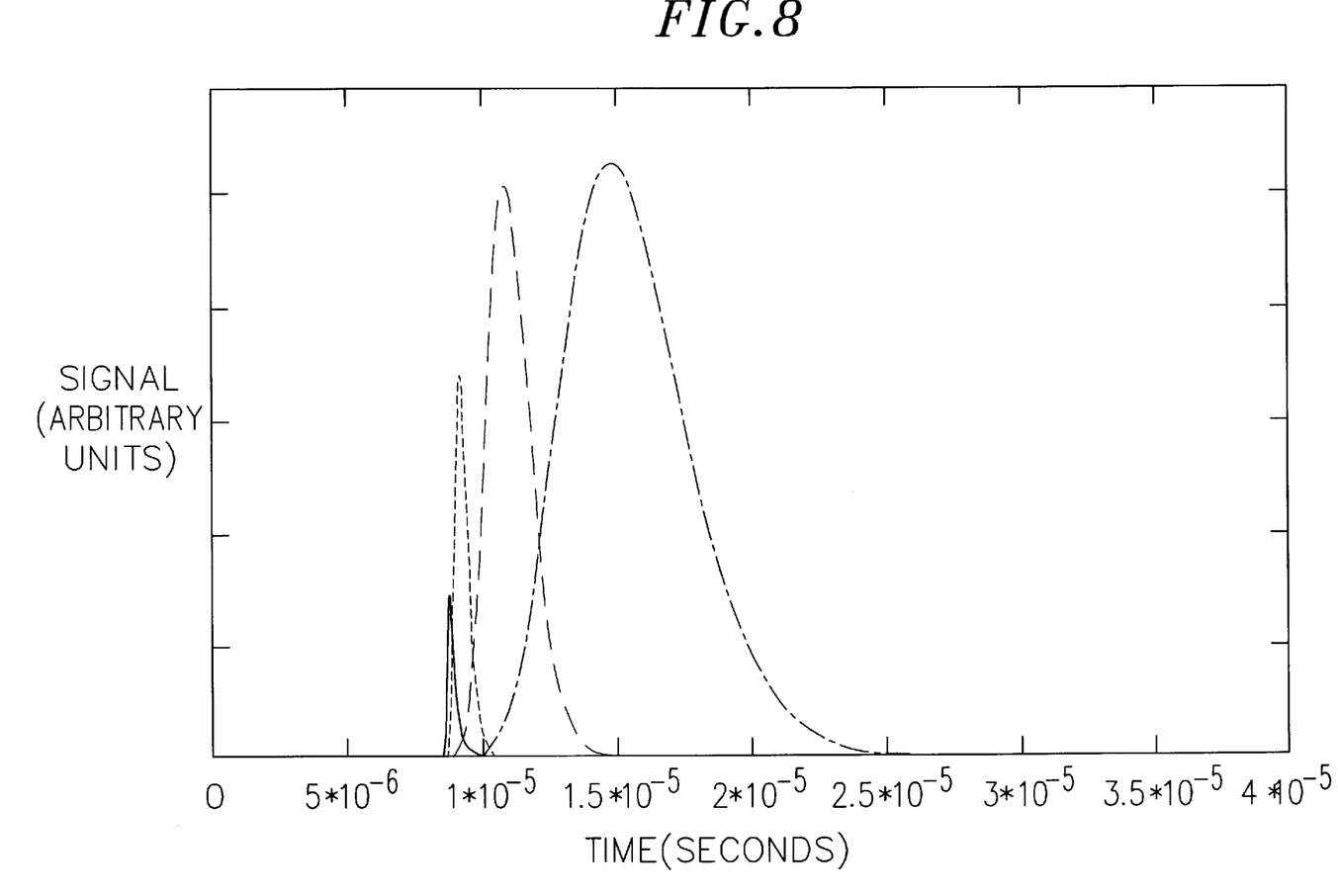
FIG. 8 is a graph of pulse shapes for a NaI(Tl) scintillator coupled to a Silicon Drift Photodetector for various shaping times.

This signal is integrated in the preamplifier and shaped by an amplifier. The amplifier shaping function is typically Gaussian or Triangular, but other shaping functions can be employed. For a typical Gaussian amplifier the shaping function is Eout=Ein $(t/\tau)^n e^{-t/\tau}$ where n is the order of the filter (n=7 is used in one embodiment of the present invention). The resulting signal is the pulse waveform observed at the output of the spectroscopy shaping amplifier. Examples of these pulses for different shaping times are shown in FIGS. 7 and 8 for CsI(Tl) and NaI(Tl) scintillators respectively. MATHCAD™ was used to implement the model and to generate the resulting simulation data. The signals shown in FIGS. 7 and 8 are for 50 ns (solid trace), 200 ns (dot trace), 1 µs (dashed trace), and 3 µs (dash-dot trace) shaping. In these two figures, the relative heights of the signals and relative time course of the signals as a function of the shaping time are important, not the specific heights or times. The calculations assume that the drift time and the scintillator decay time are equal (1100 ns for CsI(Tl) and 230 ns for NaI(Tl)). From these figures the drastic reduction in signal height with sub-optimal shaping (i.e. at too short shaping times) can clearly be seen. In addition, it can be seen that the maximum peak height for CsI(Tl) is only reached at about 3 microseconds shaping whereas for the faster NaI(Tl) scintillator it is already reached at 1 microsecond shaping time.

Figure 9:
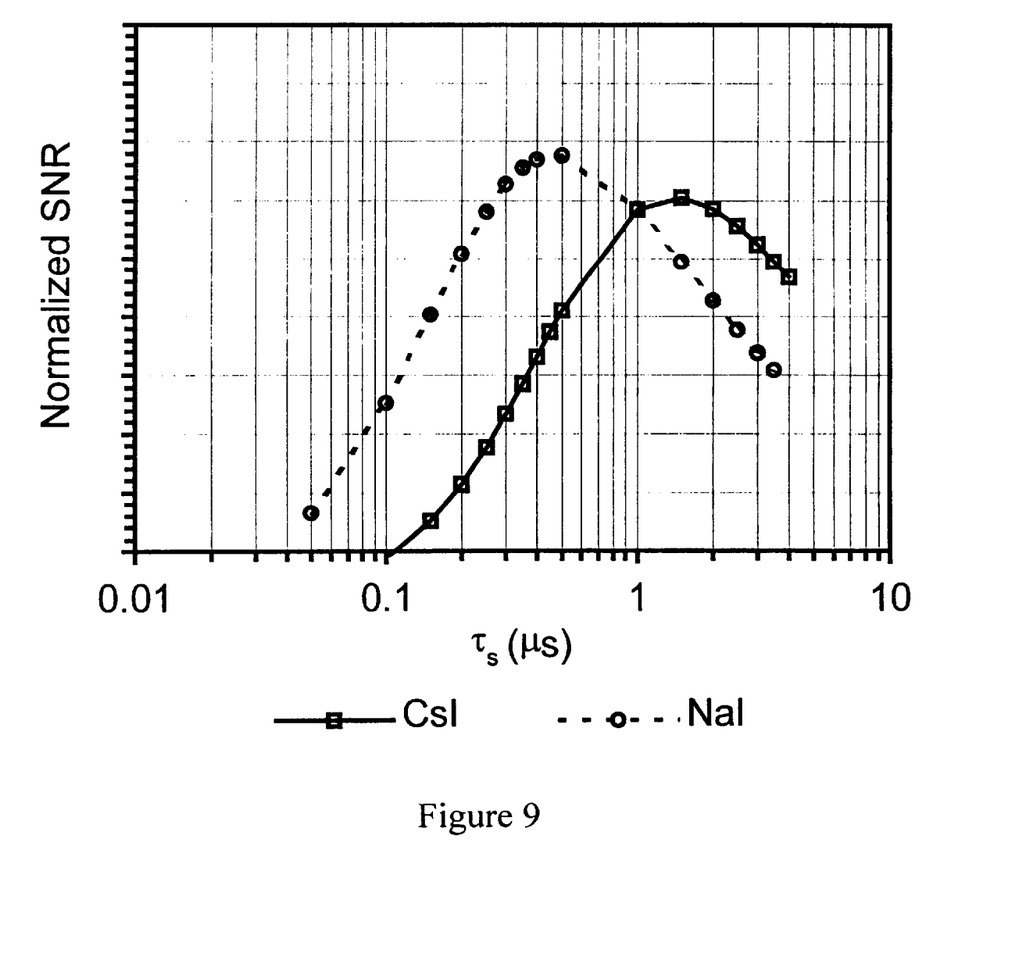
FIG. 9 is a graph of the signal to noise ratio as a function of shaping time for NaI(Tl) and CSI(Tl)scintillators coupled to Silicon Drift Photodetectors.

The signal to noise ratio can be calculated from the ratio of the signal heights (as shown in FIGS. 7 and 8) at each shaping time and the corresponding noise (Eq. 1 and FIG. 2). The data is plotted in FIG. 9 for NaI(Tl) and CsI(Tl). FIG. 9 shows the calculated signal to noise ratio as a function of shaping time for NaI(Tl) and CsI(Tl) scintillators coupled to Silicon Drift Photodetectors. The signal values are the peak amplitude of the data shown in FIGS. 7 and 8. Assumptions for the noise calculation (Equation 1) are the typical operating valus of 2 pF input capacitance, 7 mS transconductance for the input FET, 40 pA leakage current, 1.1 microsec decay time for CsI(Tl), and 230 ns decay time for NaI(Tl). From this data we see that the optimal shaping time for NaI(Tl) from the SNR point of view is centered at about 500 ns and for CsI(Tl) it is centered at about 2 µs.

The coincidence time resolution obtainable with the LSO scintillator/SDP can then be determined from Eq. 7 using the theory of leading edge timing for solid state detectors [49]. The variance of the timing, $\sigma_t^2$, in the leading edge operational mode, is given by $$\sigma_t^2 = \frac{\sigma_n^2}{(ds/dt)^2_{s=thresh}} \quad (8)$$

where $\sigma_n$, is the RMS photodetector and amplifier electronic noise at the input of the discriminator, and $(ds/dt)_{Q=thresh}$ is the slope of the pulse resultant from convolution of decay time of the scintillator with the rise time of the photodetector (Eq. 7) at the noise threshold. Using the value for the slope of s(t) derived from Eq. 7 at s(t)=50 e⁻ in Eq. 8 we obtain a value of 2.35 $\sigma_t$=1.13 ns FWHM.

This means that we can obtain coincidence timing for the LSO/SDP pair better than 2 ns FWHM. This result makes such a system very attractive for PET applications in view of the fact that current systems based on BGO/PMT provide timing of about 6 ns.

While the above description contains many specific features of the invention, these should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

What is claimed is:

1. A detector for detecting individual photons, comprising:
    a scintillator having an exit window, the cross section of said exit window substantially matched to the cross section of an entrance window of an optically-coupled silicon drift photodetector;
    said silicon drift photodetector having dimensions specified for creating a time spread of a signal generated in said silicon drift photodetector substantially matching a decay time of said scintillator,
    wherein the silicon drift photodetector has an electric field distribution for substantially matching the time spread of the signal generated in said silicon drift photodetector to the decay time of said scintillator.

2. The detector of claim 1, further including electronics for amplification of electrical signals produced by said silicon drift photodetector, the amplification having a shaping time optimized with respect to the decay time of said scintillator and time spread of the signal in said silicon drift photodetector to substantially maximize the ratio of the signal to the electronic noise.

3. The detector of claim 2, wherein the shaping time is greater than or equal-to the decay time of said scintillator and the time spread of the signal in said silicon drift.photodetector.

4. The detector of claim 1, wherein the silicon drift photodetector further comprises concentric steering electrodes formed on an opposite side of the entrance window, and wherein the concentric steering electrodes are biased such that a first predetermined voltage is applied at one of the steering electrodes near a center of the silicon drift photodetector and a second predetermined voltage is applied at another one of the steering electrodes near an edge of the silicon drift photodetector.

5. The detector of claim 4, wherein the second predetermined voltage has higher magnitude than the first predetermined voltage.

6. The detector of claim 4, wherein the steering electrodes have a shape selected from the group consisting of circle, hexagon and rectangle.

7. An imaging detector for detecting individual photons, comprising:
    a scintillator array comprising a plurality of segments, said segments having exit windows;
    a photodetector array comprising a plurality of silicon drift photodetector elements, said elements having entrance windows, wherein the cross sections of the exit windows substantially match the cross sections of the entrance windows, said elements having dimensions specified for creating a time spread of signals generated in said elements substantially matching the decay time of said segments,
    wherein said elements have electric field distributions for substantially matching the time spread of the signals generated in said elements to the decay time of said segments.

8. The imaging detector of claim 7, further including an array of readout electronics for amplification of electrical signals produced by said silicon drift photodetector elements, the amplification of each element having a shaping time optimized with respect to the decay time of said segments and time spread of the signals in said silicon drift photodetector element to substantially maximize the ratio of the signal to the electronic noise.

9. The detector of claim 8, wherein the shaping time is greater than or equal to the decay time of said scintillator and the time spread of the signal in each silicon drift photodetector element.

10. The imaging detector of claim 7, wherein each silicon drift photodetector element further comprises concentric steering electrodes formed on an opposite side of the entrance window, and wherein the concentric steering electrodes are biased such that a first predetermined voltage is applied at one of the steering electrodes near a center of the photodetector element and a second predetermined voltage is applied at another one of the steering electrodes near an edge of the photodetector element.

11. The imaging detector of claim 10, wherein the second predetermined voltage has higher magnitude than the first predetermined voltage.

12. The imaging detector of claim 10, wherein the steering electrodes have a shape selected from the group consisting of circle, hexagon and rectangle.

13. A non-imaging detector for detecting individual photons, comprising:
    a scintillator including a plurality of segments, said segments producing signals in sections of a single optically-coupled silicon drift photodetector, said sections defined by projections of the segments onto the single silicon drift photodetector, said scintillator segments having lateral dimensions and a decay time and the single silicon drift photodetector having specified dimensions such that a time spread of a signal produced in the single silicon drift photodetector is substantially matched to the decay time in the scintillator segments,
    wherein the single silicon drift photodetector has an electric field distribution for substantially matching the time spread of the signal generated in the single silicon drift photodetector to the decay time in the scintillator segments.

14. The detector of claim 13, further including readout electronics for amplification of said signals, the amplification having a shaping time optimized with respect to the decay time of said scintillator and time spread of the signal in said silicon drift photodetector to substantially maximize the ratio of the signal to the electronic noise.

15. An imaging detector for detecting individual photons, comprising:
    a scintillator having an exit window, the cross section of said exit window substantially matched to the cross section of an entrance window of an optically-coupled silicon drift photodetector array; said silicon drift photodetector array including a plurality of elements, said elements having dimensions specified for creating a time spread of signals generated in said elements substantially matching a decay time of said scintillator;
    an optical diffuser optically coupled on one side to said scintillator and on another side to said silicon drift photodetector array, so as to cause a distribution of light photons generated in the scintillator to neighboring pixels of the silicon drift photodetector array, wherein said elements have electric field distributions for substantially matching the time spread of the signals generated in said elements to the decay time of said scintillator.

16. The imaging detector according to claim 15, further including readout electronics for amplification of electrical signals produced by said silicon drift photodetector elements, the amplification of the elements having shaping times optimized with respect to the decay time of said scintillator and time spread of the signals in said silicon drift photodetector elements to substantially maximize the ratio of the signal to the electronic noise.

* * * * *